Patented Aug. 14, 1945

2,382,686

UNITED STATES PATENT OFFICE 2,382,686

METHOD OF MAKING 4-METHYL-PHENYL-ACETONE

Wilhelm Wenner, Montclair, N. J., assignor to Hoffmann-La Roche, Inc., Nutley, N. J., a corporation of New Jersey No Drawing. Application March 16, 1942, Serial No. 434,954. In Switzerland March 19, 1941

1 Claim. (Cl. 260—590)

This invention relates to an improved method of preparing 4-methyl-phenyl-acetone, a compound which may be employed as an intermediate in the preparation of agents having therapeutic value.

It is known that derivatives of the group of the phenyl alkylamines show very distinctive pharmacological properties. They act mainly on the sympathetic system, and hence are usually called sympathomimetics. While these compounds in general possess similar pharmacological properties, the various members show slight differences in their behavior, depending on their chemical substituents. Thus, several derivatives of the phenyl-alkylamines have been accepted by the medical profession as valuable therapeutics.

From the compound of my present invention I may readily prepare alpha-(4-methyl-phenyl)-beta-methylamino-propane

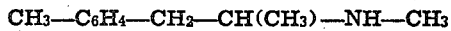

$CH_3—C_6H_4—CH_2—CH(CH_3)—NH—CH_3$

This substance produced similar effects to those produced by benzedrine.

The method of making 4-methyl-phenyl-acetone preferably comprises the following steps:

1. Condensation of 4-methyl benzylcyanide with ethyl acetate to alpha-(4-methyl-phenyl)-acetoacetonitrile:

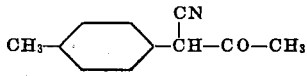

2. Saponification of the cyanogroup from alpha-(4-methyl-phenyl)-acetoacetonitrile, thus yielding (4-methyl-phenyl)-acetone.

By hydrogenation of (4-methyl-phenyl)-acetone in presence of methylamine, alpha-(4-methyl-phenyl)-beta-methylamino-propane may be formed.

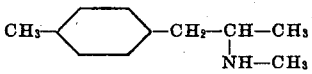

The synthesis of the ketone according to the following example illustrates the above method of carrying out the present invention, but it is to be understood that this example is given as an illustration and not as limitation of the present invention.

Example 30 parts by weight of sodium are dissolved in 300 parts by weight of absolute alcohol. This solution is heated with a reflux condenser. A mixture of 131 parts by weight of p-methyl-benzyl-cyanide and 131 parts by weight of dry ethyl acetate is added drop by drop and the mixture boiled with a reflux condenser for 2 hours. On standing, part of the condensation product crystallizes in form of the sodium salt. The main portion of the solvent is evaporated under reduced pressure, the residue dissolved in about 1000 parts by weight of ice water and the filtered solution acidified with acetic acid while cooling with ice. The separated oil is taken up in benzene or ether: the solution of the condensation product is separated, washed with water and evaporated. By fractionating in vacuo alpha-(4-methyl-phenyl)-beta-oxobutyric acid nitrile is obtained as an oil of boiling point 155–158° C. at 10 mm. pressure, which solidifies at room temperature and then melts at 98°.

6 parts by weight of the nitrile are added dropwise to 60 parts by weight of ice-cold 80% sulfuric acid while stirring. When complete solution has taken place, the reaction mixture is held for about 2 hours at 80–100° C. It is then cooled, quickly treated with about 10 times its quantity of water while stirring and boiled for a few hours under reflux condenser. After cooling, the resulting brown oil is separated and purified by distillation in vacuo. (4-methyl-phenyl)-acetone is obtained in good yield as a colorless oil of boiling point 104–106° C. at 10 mm. pressure.

In order to prepare the above described amine from ketone, I may proceed as follows:

50 parts by weight of a 25% solution of methylamine in absolute methyl-alcohol are treated with 20 parts by weight of (p-methyl-phenyl)-acetone while cooling with a freezing mixture. 2 parts by weight of a nickel catalyst, prepared in accordance with Raney, which has been rendered anhydrous as far as possible by washing with methyl-alcohol, are added immediately and the mixture is hydrogenated at a gauge pressure of a few atmospheres and a temperature of 90–100° C. The calculated quantity of hydrogen is taken up in a short time. After cooling, the solution is sucked off from the catalyst, the solvent evaporated and the residue fractionated in vacuo. Alpha (4-methyl-phenyl)-beta-methyl-amino-propane is obtained in good yield as a colorless oil of boiling point 105–106° C. at 10 mm. pressure.

In order to prepare salts of the described compound with acids, equivalent amounts of the alpha-(4-methyl-phenyl)-beta-methylamino propane and an acid are dissolved in a suitable solvent, preferably water or alcohol, and the salt isolated by evaporation of the solution to dryness.

The following example shows the procedure in the case of the hydrobromide:

163 parts by weight of the (4-methyl-phenyl)-beta-methylamino-propane are stirred with 100 parts of water. The mixture is kept cool by external cooling with ice-water. 42 parts of 20% hydrobromic acid is slowly added. The solution is evaporated to dryness in the vacuum. The colorless residue is dissolved in absolute alcohol and filtered. To the filtrate absolute ether is added. The hydrobromide separates in small colorless crystals, which are filtered and dried in the desiccator.

The crystals contain one-half molecule of alcohol. They show the melting point 159° C.

Analysis: $C_{11}H_{17}N \cdot HBr \cdot \frac{1}{2}C_2H_5OH$

Caculated: 54.2% C, 7.6% H, 5.3% N, 30.0% Br.
Found: 54.1% C, 7.6% H, 5.3% N, 29.6% Br.

What I claim is:

A method of making 4-methyl-phenyl-acetone, which comprises heating 4-methyl-benzyl-cyanide with ethyl-acetate in an alcoholic solution of sodium alcoholate, and heating the resultant alpha-(4-methyl-phenyl)-acetoacetonitrile with acid to effect saponification of the cyano group.

WILHELM WENNER.